US007793607B1

(12) United States Patent
Geist

(10) Patent No.: US 7,793,607 B1

(45) Date of Patent: Sep. 14, 2010

(54) AIR POWERED CIVIL DEFENSE SIREN

(76) Inventor: Deney James Geist, 2 Maverick Dr., Wichita, KS (US) 67220-4911

( * ) Notice: Subject to any disclaimer, the term of this patent is extended or adjusted under 35 U.S.C. 154(b) by 137 days.

(21) Appl. No.: 12/151,396

(22) Filed: May 6, 2008

(51) Int. Cl.
*G01W 1/02* (2006.01)
*G08B 21/10* (2006.01)

(52) U.S. Cl. ................. 116/4; 116/137 R; 116/142 FP; 116/70; 340/601; 340/404.1

(58) Field of Classification Search ..................... 116/4, 116/137 R, 142 FP, 70; 340/404.1, 404.3, 340/601
See application file for complete search history.

(56) References Cited

U.S. PATENT DOCUMENTS

| | | | | | |
|---|---|---|---|---|---|
| 64,716 | A | * | 5/1867 | Shaw | 116/137 R |
| 870,074 | A | * | 11/1907 | Heyer | 116/142 R |
| 992,487 | A | * | 5/1911 | Ellison | 116/137 R |
| 1,315,019 | A | * | 9/1919 | Astrom | 116/137 R |
| 1,655,675 | A | * | 1/1928 | Cunningham | 116/142 FP |
| 1,779,795 | A | * | 10/1930 | Backstatter | 116/137 R |
| 1,815,553 | A | * | 7/1931 | Eckhardt | 116/142 FP |
| 2,626,585 | A | * | 1/1953 | Mendes | 116/102 |
| 2,678,625 | A | * | 5/1954 | Hall | 116/137 R |
| 2,699,493 | A | * | 1/1955 | Mccullough et al. | 455/133 |
| 3,000,344 | A | * | 9/1961 | Ferrell | 116/137 R |
| 3,103,911 | A | * | 9/1963 | Tappan et al. | 116/137 R |
| 3,157,153 | A | * | 11/1964 | Moe | 116/137 R |
| 3,277,861 | A | * | 10/1966 | Moe | 116/137 R |
| 3,581,705 | A | * | 6/1971 | Holm | 116/142 FP |
| 3,682,129 | A | * | 8/1972 | Philbrick | 116/70 |
| 3,725,886 | A | | 4/1973 | Marks | |
| 3,785,335 | A | | 1/1974 | Wagner | |
| 4,166,428 | A | | 9/1979 | Freeman et al. | |
| 4,168,493 | A | | 9/1979 | Romero | |
| 4,632,052 | A | * | 12/1986 | Green | 116/70 |
| 4,686,928 | A | * | 8/1987 | Weisenberger | 116/137 R |
| 4,970,983 | A | * | 11/1990 | LeBlanc et al. | 116/142 FP |
| 5,170,634 | A | * | 12/1992 | Squires | 62/126 |
| 5,362,207 | A | * | 11/1994 | Martin et al. | 417/243 |
| 5,460,116 | A | * | 10/1995 | Gyorgy | 116/142 FP |
| 5,662,064 | A | * | 9/1997 | Gyorgy | 116/142 FP |
| 5,826,998 | A | * | 10/1998 | Shih | 401/52 |
| 7,063,040 | B2 | | 6/2006 | Woods | |
| 2002/0029733 | A1 | * | 3/2002 | Timmons, Jr. | 116/137 R |

* cited by examiner

*Primary Examiner*—Randy W Gibson
(74) *Attorney, Agent, or Firm*—Robert O. Blinn

(57) ABSTRACT

A civil defense air powered siren includes an air powered tone generator, a compressed air tank, an air compressor, an air line with a control valve connecting between the compressed air tank and the tone generator. A pressure switch communicates with the compressor and the compressed air tank. The pressure switch activates the compressor to charge the compressed air tank when air pressure in the tank falls below a pre-selected limit. The control valve is remotely controlled preferably by a radio signal to cause the control valve to open the air line and supply the tone generator with air in order to cause a civil defense warning tone to be generated when it is appropriate to do so.

5 Claims, 4 Drawing Sheets

AIR POWERED CIVIL DEFENSE SIREN

FIELD OF THE INVENTION

This invention relates to a civil defense siren which is powered by compressed gas.

BACKGROUND OF THE INVENTION

Civil defense warning sirens typically include a powered siren or horn which is activated when a weather hazard such as a tornado or hurricane is approaching or is in the vicinity of the siren. Typical prior art sirens are generally powered by electricity which is supplied by a local electric utility power grid. One significant short-coming of this arrangement is it is an approaching tornado can disable the electrical power transmission and distribution means supplying power to a defense siren. Thus, the very event of which a prior art civil defense siren is intended to warn the public may prevent the siren from operating. What is needed is a civil defense siren which will operate when external power is absent.

BRIEF DESCRIPTION

The aforementioned need is addressed by an air powered civil defense siren apparatus which is powered by compressed air stored in a compressed air tank. The air powered civil defense siren includes an air powered tone generator, a compressed air tank, an air compressor, an air line with a control valve connecting between the compressed air tank and the tone generator. A pressure switch communicates between the compressor and the compressed air tank. The pressure switch activates the compressor to charge the compressed air tank when air pressure in the tank falls below a pre-selected limit. The control valve is remotely controlled to cause the control valve to open the air line and supply the tone generator with air in order to cause a civil defense warning tone to be generated when it is appropriate to do so. It is preferable that the control valve and any associated signal receiver for operating the control valve is powered by a rechargeable battery so that the control valve may be activated in the absence of an external power supply. Thus, the stored compressed air in the compressed air tank supplies the tone generator even when external power is not available for the apparatus.

DETAILED DESCRIPTION

Figure 1:
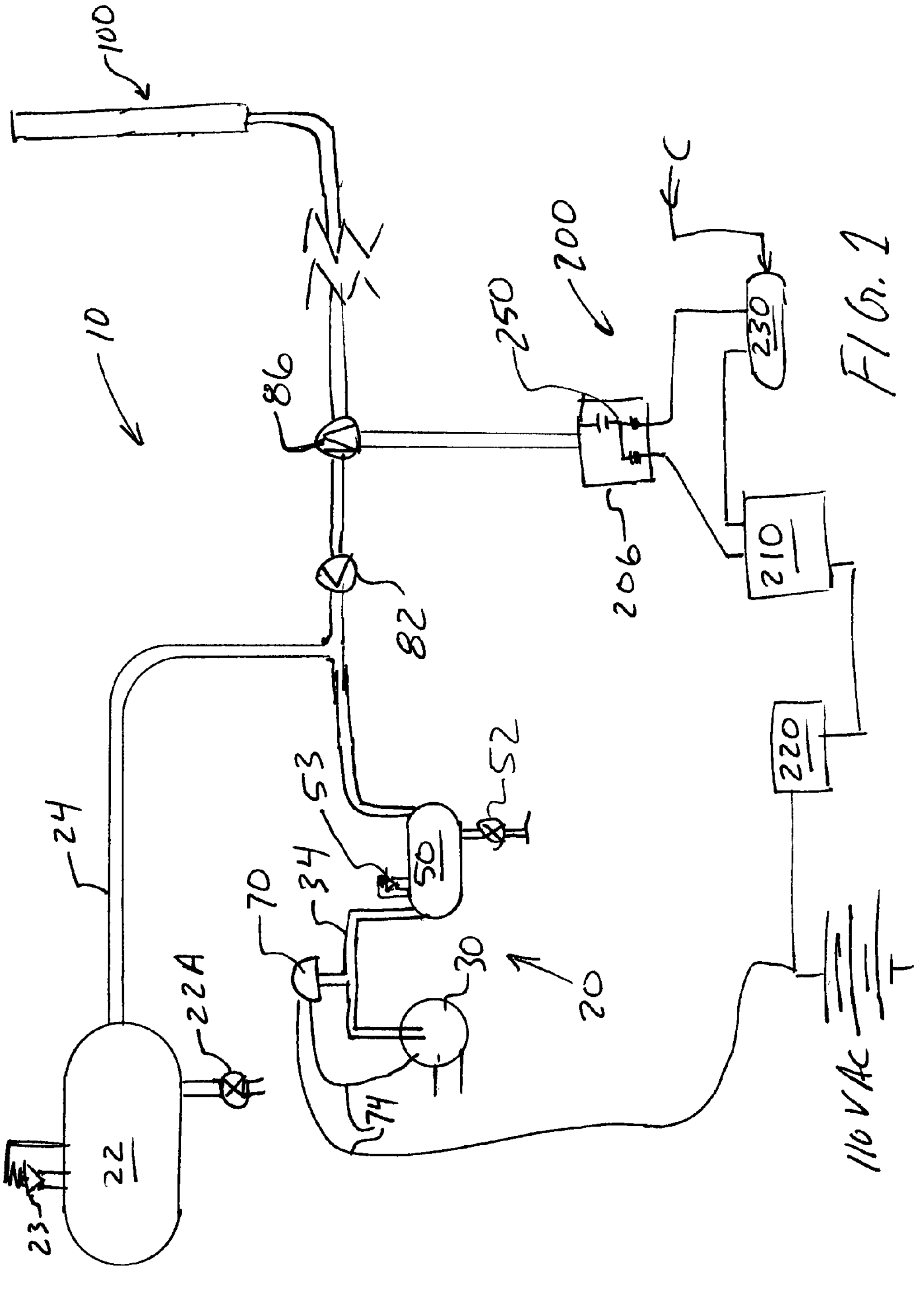
FIG. 1 is a schematic diagram of the air powered civil defense siren apparatus.

Referring to the drawings, FIG. 1 provides a schematic diagram of an air powered civil defense siren apparatus 10 (hereafter siren apparatus 10) which is an example embodiment of the present invention. Siren apparatus 10 may be generally considered as including an air supply portion 20, a tone generator 100 and a control portion 200. As can be seen in FIG. 1, air supply portion 20 generally includes a compressed air storage tank 22 (hereafter storage tank 22), an air compressor 30, an air receiver tank 50, a pressure switch 70 and an air supply line 80 for supplying pressurized air to tone generator 100 which will be described in greater detail below. Air supply line 80 extends between air receiver tank 50 and tone generator 100 and includes a pressure control valve 82 and a control valve 86. Control valve 86 is controlled by control portion 200 which will also be described in greater detail below.

As noted above, air supply portion 20 generally includes air storage to tank 22, a compressor 30, an air receiver tank 50 and a pressure switch 70. An air supply line 80 which includes pressure control valve 82 and control valve 86 delivers air from the air storage portion to tone generator 100. Air storage tank 22, and air receiver tank 50 are connected by at least one first line 24 as shown in FIG. 1. Compressor 30 and air receiver tank 50 may be interconnected by at least one second line 34 as shown in FIG. 1. Pressure switch 70 communicates with second line 34. Pressure switch 70 is also connected to an electrical power supply circuit 74 which supplies electrical power to air compressor 30. Pressure switch 70 is arranged to normally open circuit 74 but will close circuit 74 and thus switch electrical power to activate air compressor 30 when the pressure in second line 34 falls below a predetermined pressure. The primary purpose of air receiver tank 50 is to cool air from air compressor 30 and capture moisture from the compressed air before it enters air storage tank 22. Air receiver tank 50 includes a condensate drain valve 52 for removing condensed water from the system and a pressure relief valve 53 for venting excess pressure. Optionally, pressure switch 70 may be placed directly in communication with air tank 22 and air compressor 30 may also be placed in direct communication with air tank 22 thereby using air storage tank 22 to dissipate heat and to trap moisture for release by a condensate drain valve 22A. Pressure control valve 82 reduces the pressure of air supplied by air supply portion 20 to a pressure which is appropriate for use by tone generator 100.

Air storage tank 22 should preferably be an ASME labeled pressure vessel for outdoor use. Preferably, air storage tank 22 has an operating pressure of 150 psig and is rated for 225 psig. A pressure relief valve 23 communicating with the inside volume of tank 22 prevents the system from being over pressurized. A condensate drain valve 22A is communicates with the bottom of tank 22 and is adapted to trap and expel moisture from tank 22. Pressure control valve 82 reduces the pressure of air supplied by the air supply system from generally 100 to 140 psig in the air storage system to generally 30 to 50 psig and preferably 40 psig for tone generator 100.

Pressure switch 70 activates air compressor 30 when pressure in the air storage system falls below a predetermined lower limit. If compressor 30 is powered by an electric motor, pressure switch 70 is placed in the power supply circuit for the electric motor of compressor 30. Preferably, the electric motor of compressor 30 is powered by readily available electricity supplied by an electric utility power grid as is commonly available in populated areas. Pressure switch 70 is normally open and closes when the measured pressure in line 34 falls below a predetermined level. By way of example, pressure switch 70 may be set to close and start the air compressor when air pressure in line 34 falls below 100 psig and then to open once air pressure in line 34 rises above 125 psig. The applicant has found that a Square-D™ No 9013GHG-6J63 sold by Schneider Electric Company is an acceptable pressure switch for this purpose.

A control portion 200 controls the flow of air from air supply line 80 to tone generator 100. As noted above, the portion of air in supply line 80 which is down stream of pressure control valve 82 provides a flow of air which is between 30 psig and 50 psig and preferably at generally 40 psig. Thus tone generator 100 is optimized to produce a loud warning tone when supplied with 40 psig air. Control valve 86 is a normally closed valve which opens when presented with an open signal from control portion 200. Control portion 200, in this example, includes a valve operator 206, a battery 210, a battery charger 220, a control signal receiver 230 and a relay 250. Valve operator 206 is closely associated with control valve 86 and in this example, operates between a power off mode wherein valve 86 is closed and a power on mode in which valve operator 206 opens valve 86. Valve operator 206 is connected to relay 250 so that when relay 250 receives an activation signal, relay 250 closes a circuit interconnecting battery 210 and valve operator 206. Relay 250 is connected to control signal receiver 230 such that when control signal receiver 230 receives an activation signal, it energizes relay 250. Typically, battery 210 and the associated power circuit powering valve operator 206 may be a 12 Volt direct current system. Control signal receiver 230 may be of a conventional design as is well known in the art. Control signal receiver 230 may be any device adapted to receive signals from a remote location such as a radio receiver or a telephone receiver or a device which uses a fiber-optic connection to receive signals. Control signal receiver 230 typically presents a small amount of current to relay 250 which then switches the more substantial 12V current for activating valve operator 206. Battery charger 220 is connected to the same power supply for powering compressor 30 and is of a conventional design and includes a circuit breaker to maintain storage battery 210 at a full charge.

Figure 2:
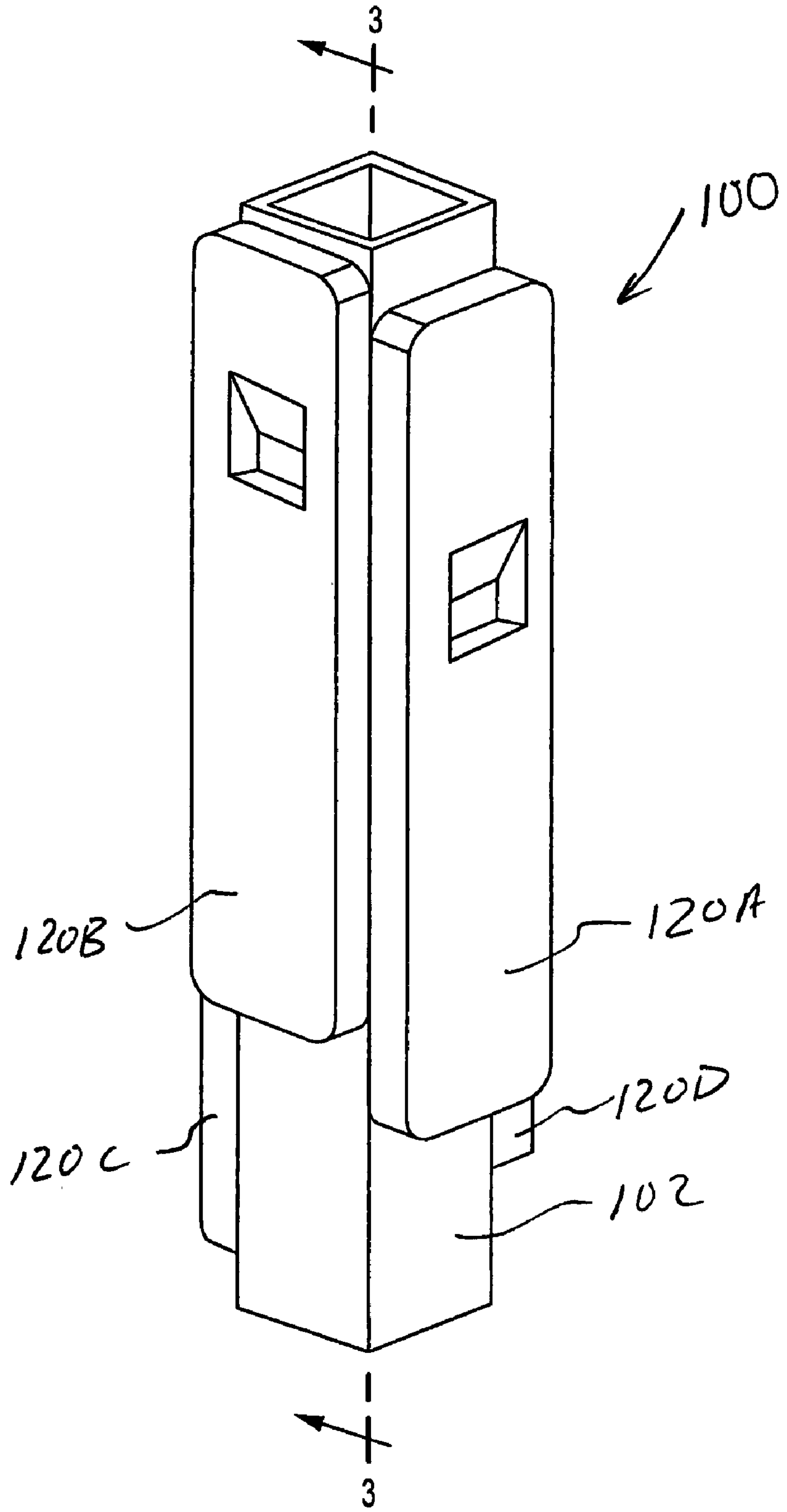
FIG. 2 is a perspective view of a tone generator of the type which may be used with the air powered civil defense siren apparatus.
Figure 3:
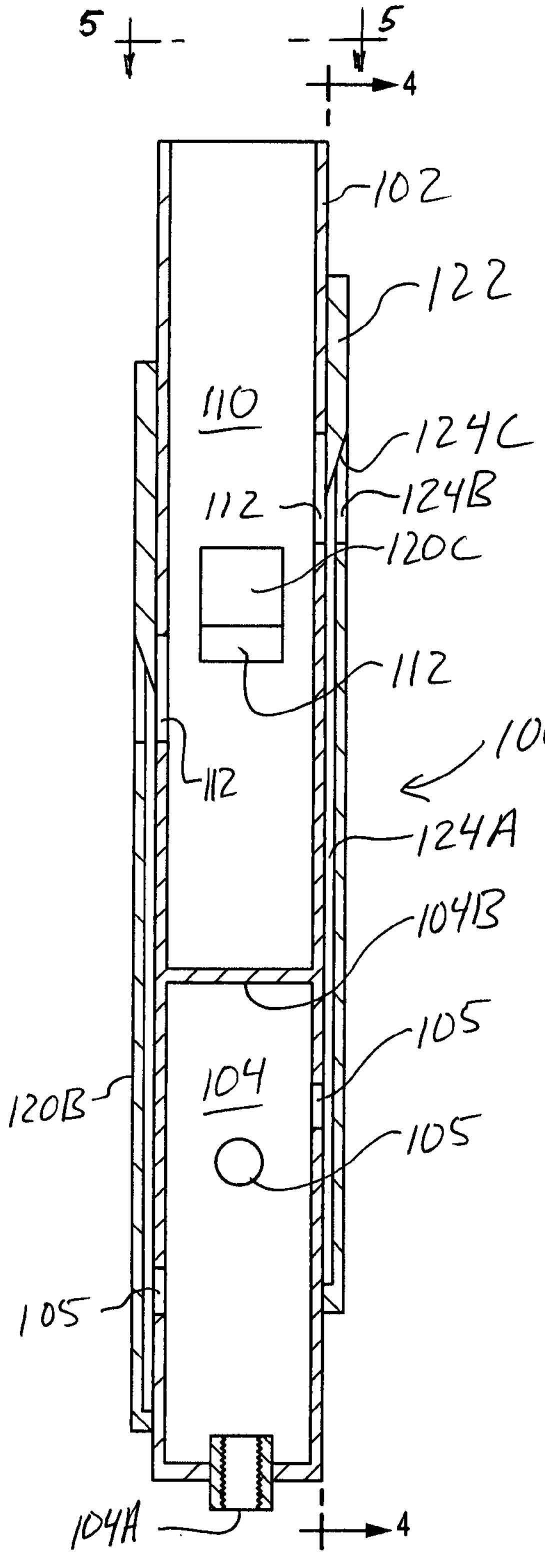
FIG. 3 is a partial cross section view taken from plane 3-3 of FIG. 2 showing a cross section of the tone generator shown in FIG. 2.
Figure 4:
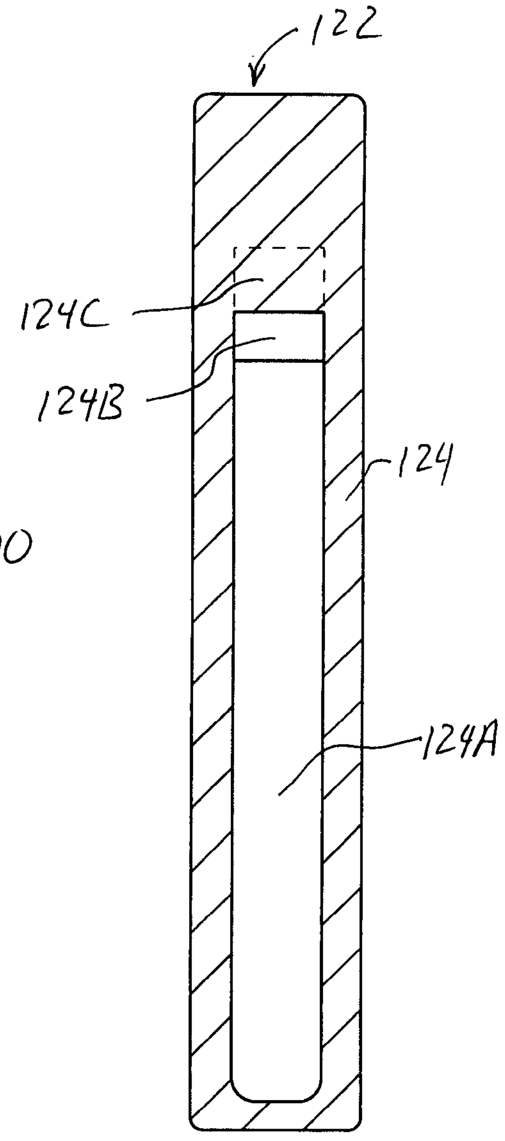
FIG. 4 is a cross section view taken from plane 4-4 of FIG. 3.

Tone generator 100 is adapted to receive preferably 40 psig compressed air and produce a warning signal having a volume of approximately 110 decibels at ten feet from the tone generator at approximately 450 HZ. It is preferable tone generator 100 produce multiple frequency sounds which will alternately reinforce and cancel at various frequency components of the sound to produce a distinctive warbling warning signal. A detailed design for an example tone generator 100 is provided in FIGS. 2 and 3. As can be seen in FIGS. 2-4, tone generator 100 includes a body 102 having a lower air chamber 104 and an upper chamber 110. Four whistle plates 120A, 120B, 120C and 120D are fixed to the outside surfaces of body 102. Whistle plates 120A-120D will be described in greater detail below.

Tone generator body 102 includes a lower chamber 104 and an upper chamber 110 as shown in FIG. 3. Lower chamber includes an inlet 104A, and one outlet hole 105 bored in each of the four inside walls of lower chamber 104. The positions of each outlet hole may be staggered as shown in FIG. 3. Lower chamber 104 is closed at its upper end by an upper wall 104B. Upper chamber 110 is located immediately above lower chamber 104. Upper chamber 110 is closed at the bottom by upper wall 104B of lower chamber 104 and is open at the top as shown in FIG. 3. The walls of upper chamber 110 have four staggered generally rectangular openings 112 as shown in FIG. 3. Tone generator body may be fashioned from any suitable material which is rigid and strong. A solid bar of aluminum may be machined to present the internal cavities of tone generator body 102 and then closed with a plate with the appropriate features. The skilled reader may envision a number of ways to fabricate tone generator body 102. One option would be to select a U-shaped profile, machined it to add outlet holes 105, rectangular openings 112 and add plates to define the upper and lower walls of lower chamber 104 as well as a plate to close the U shaped channel. and then closed with fastened components. The general dimensions of tone generator body may be on the order of 2 inches by 2 inches by 15 inches. The skilled reader will appreciate that such dimensions may be varied considerably to fabricate various sizes of tone generators. Further, a square shape has been selected for the cross section. The skilled reader will appreciate that any one of a number of polygonal cross sections may be selected as well as other cross sections for the shape of tone generator body 102.

Whistle plates 120A-120D may be generally similar in shape and size as is shown in FIG. 2. Whistle plates 120A-120D are preferably bonded to the outside walls of tone generator body 102. Whistle plate 120D is shown in FIG. 4 and will be described in detail. The skilled reader should understand whistle plates 120A-120C are generally identical in geometry and may differ slightly in positioning as shown in FIG. 2 and in the size and shape of some of the other features in order to generate varying frequencies of sound. Whistle plate 120D has a flat plate shaped body 122 having a mating surface 124 fashioned to mate with the flat outside surface of tone generator body 102 as shown in FIG. 2. As can be seen in FIGS. 3A, 3AA, 3B and 3BB, whistle plate 120 has a channel 124A defined in mating surface 124. Channel 124A may be fairly shallow—on the order of 0.025 to 0.050 inches. As can be seen in FIGS. 3 and 4, channel 124A is closed at its lower end but extends far enough to receive pressurized air from lower chamber 104 through outlet hole 105. The upper end of channel 124A includes an opening 124B which presents a wedge feature 124C which is defined from the opposite side of whistle plate 120A. The lower edge of opening 124B is square, but the upper edge of opening 124B is cut at a shallow angle to present a sharp wedge shaped blade element 124D as shown in FIG. 4. As can be seen in FIG. 4, whistle plate 124 is positioned so that the lower edge of opening 124B generally aligns with the lower edge of rectangular opening 112 of upper chamber 110 of tone generator body 102. Wedge feature 124C extends below the upper edge of rectangular opening 112. As can be seen in FIG. 3, the upper end of channel 124A is closed except for opening 124B. Thus, air enters channel 124A and is forced across wedge feature 124C of the tone generator body 102 to generate a tone. Air flowing through channel 124A actually does not enter upper chamber 110 through opening 112. As air from channel 124A flows across wedge feature 124C the Venturi effect produces relatively low air pressure in opening 112 which causes air from upper chamber 110 to be drawn out through opening 112. This geometry is repeated on the other four sides of tone generator body 102. Because the openings 124B are staggered as shown in FIG. 3, upper chamber 110 presents varying columns for resonating the sound waves generated by the wedge features thereby causing various pitches to be generated. If the frequencies of those pitches are sufficiently dissonant, the combined tone may warble in a manner which attracts attention and increases the effectiveness of a warning tone.

Figure 5A:
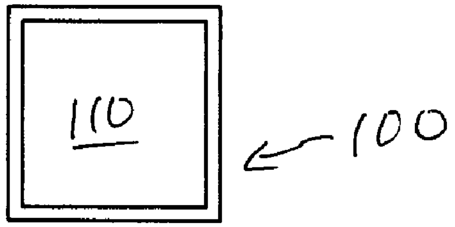
FIG. 5A is a top view of upper chamber 110 taken from plane 5-5 of FIG. 4.
Figure 5B:
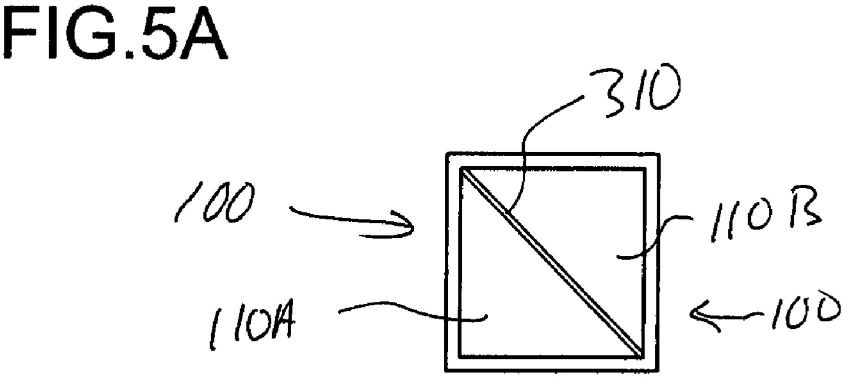
FIG. 5B is a top view of upper chamber 110 taken from plane 5-5 of FIG. 4 showing a first optional added divider.
Figure 5C:
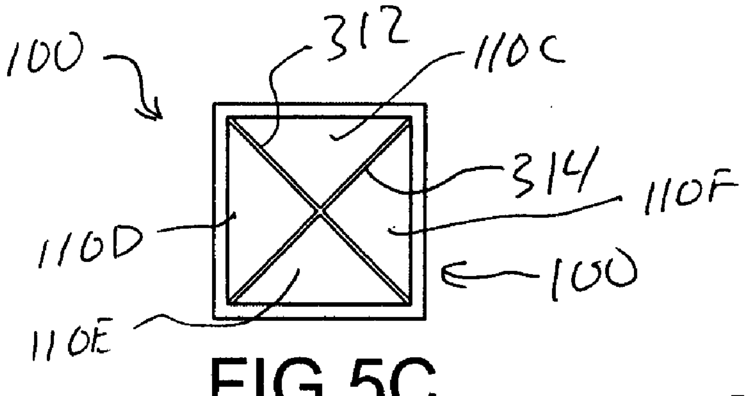
FIG. 5C is a top view of upper chamber 110 taken from plane 5-5 of FIG. 4 showing first and second optional added dividers.
Figure 5D:
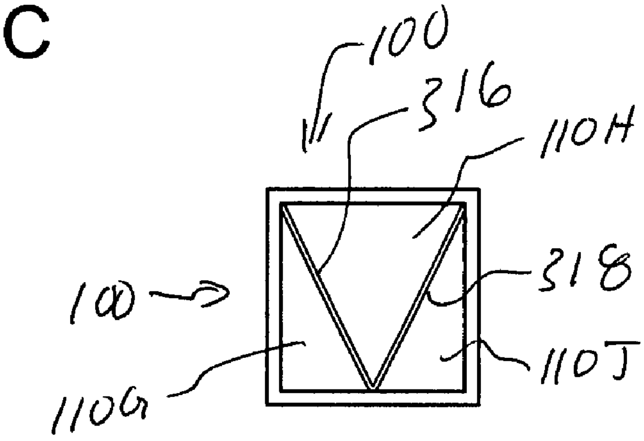
FIG. 5D is a top view of upper chamber 110 taken from plane 5-5 of FIG. 4 showing first and second optional added dividers.

As shown in FIGS. 5B-5D, upper chamber 110 may be divided by various optional dividers into separate chambers for generating varying tones. In FIG. 5B, upper chamber 110 is divided by an optional divider 310 into chambers 110A and 110B. In FIG. 5C, upper chamber 110 is divided by optional dividers 312 and 314 into chambers 110C, 110D, 110E and 110F. FIG. 5C, upper chamber 110 is divided by optional dividers 316 and 318 into chambers 110G, 110H and 110J.

As can be understood from the above detailed description, civil defense siren apparatus 10 is configured to be fully operational even when its external power supply fails. The battery supplies power for driving the receiver and for actuating tone generator 100. As long as sufficient pressurized air is available from storage tank 22, tone generator 100 may be operated and may provide a loud warning tone. Thus, with the present invention. the tragic circumstance of a tornado disabling a local power grid and thereby disabling tornado warning sirens may be avoided.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A civil defense tone generator, comprising;

(a) a compressed air tank, (b) an air compressor and a prime mover for powering the air compressor, (c) a pressure switch set at a pre-selected lower limit pressure in communication with the compressor and at least indirectly with the compressed air tank, the pressure switch adapted to activate the air compressor when the pressure in the air receiver tank and the compressed air tank is below the pre-selected lower limit pressure, (d) a tone generator which receives a flow of compressed air and generates a tone, the tone generator having a lower chamber including an inlet for receiving the flow of compressed air, an upper chamber having at least one opening defined in its outside wall and at least one channel in communication with the lower chamber and extending past the at least one opening in the upper chamber, the channel bounded by an outside wall including a whistle plate having a sharp edged blade element positioned proximate to the at least one opening in the upper chamber so that air passing through the channel will vibrate to produce a tone, (e) an air supply line pneumatically communicating at least indirectly between the air storage tank and the tone generator, (f) a control valve in the air supply line, the control valve movable between an open position and a closed position for opening and closing pneumatic communication through the air supply line, the control valve adapted to deliver air to the tone generator at a pressure that is substantially lower than the pre-selected lower limit pressure of the compressed air tank, (g) a controller including a remote signal receiver, the controller connected to the control valve and adapted for changing the position of the control valve between the closed position wherein no tone is generated and the open position wherein a tone is generated in response to a signal from a remote location.

2. An apparatus of claim 1, wherein the controller has a remote signal receiver adapted to receive a predetermined signal to cause the controller to change the position of the control valve from the closed position to the open position.

3. An apparatus of claim 1, wherein;

the controller has a radio receiver adapted to receive (a) a first predetermined signal to cause the controller to change the position of the control valve from the closed position to the open position and (b) a second predetermined signal to cause the controller to change the position of the control valve from the open position to the closed position.

4. An apparatus of claim 1, wherein;

the control valve is normally closed, and the controller has a radio receiver adapted to receive a predetermined signal to cause the controller to change the position of the control valve from the normally closed position to the open position and wherein the controller is adapted to change the position of the control valve from the open position to the closed position when the predetermined signal ceases.

5. A method for warning residents of a residential area of an increased risk of the approach of a tornado including the following steps;

(a) constructing a tornado siren warning unit including an air compressor, a compressed air tank, an air powered warning tone generator, an air line communicating between the compressed air tank and the tone generator, a control valve in the air line supplying the tone generator, a remote radio signal receiver operatively associated with the control valve such that the control valve is opened upon receiving a first signal thereby activating the tone generator, and such that the control valve is closed upon receiving a second signal thereby deactivating the tone generator, (b) supplying power to the compressor such that the compressed air tank is maintained at a predetermined pressure, (c) setting the control valve to supply air to the tone generator at a pressure that is substantially below the predetermined pressure of the compressed air tank, whereby, the compressed air tank maintains a reserve of compressed air for powering the tone generator for a period of time even when it is not possible to supply power to the compressor, (d) detecting conditions which indicate a pre-determined amount of increased risk of the approach of a tornado toward the residential area, (e) generating a remote radio signal for reception by the radio signal receiver to cause the tone generator to be activated to thereby warn the residents, whereby, a warning tone will be generated to warn the residents even if an approaching tornado has destroyed the means for providing power to the tornado siren warning unit.

* * * * *